United States Patent [19]
Esaki et al.

[11] Patent Number: 4,481,520
[45] Date of Patent: Nov. 6, 1984

[54] ELECTROOSMOTIC INK PRINTER HEAD

[75] Inventors: Hiroshi Esaki, Neyagawa; Tadao Kohashi, Moriguchi, both of Japan

[73] Assignee: Matsushita Electric Industrial Co., Ltd., Osaka, Japan

[21] Appl. No.: 462,631

[22] Filed: Jan. 31, 1983

[30] Foreign Application Priority Data

Feb. 3, 1982 [JP] Japan .................................. 57-16021
Jun. 7, 1982 [JP] Japan .................................. 57-97936

[51] Int. Cl.³ .......................................... G01D 15/16
[52] U.S. Cl. .............................................. 346/140 R
[58] Field of Search ................................. 346/140 PD

[56] References Cited

U.S. PATENT DOCUMENTS 4,383,265  5/1983  Kohashi ...................... 346/140 PD
4,396,925  8/1983  Kohashi ...................... 346/104 PD Primary Examiner—George H. Miller, Jr.
Attorney, Agent, or Firm—Pollock, Vande Sande & Priddy

[57] ABSTRACT

An electroosmotic ink printer head comprising a dielectric support having a surface defined by longitudinal front and rear edges and a pair of transverse edges. A plurality of first electrodes is successively arranged on said surface extending rearward from the front side of the support. A porous member is provided to overlie the first electrodes in contact with said surface. On the porous member is a second, liquid-permeable electrode on which is provided a means for supplying ink thereto to allow it to permeate therethrough to the porous member. A third electrode is located adjacent to each outermost one of the first electrodes and to the longitudinal front edge. A potential is applied to the third electrode with respect to the second electrode to cause the ink in the porous member to electroosmotically move in a direction from the third electrode to the second electrode. The ink which might wet the front edge of the support is pulled rearward by the electroosmotic movement.

16 Claims, 10 Drawing Figures

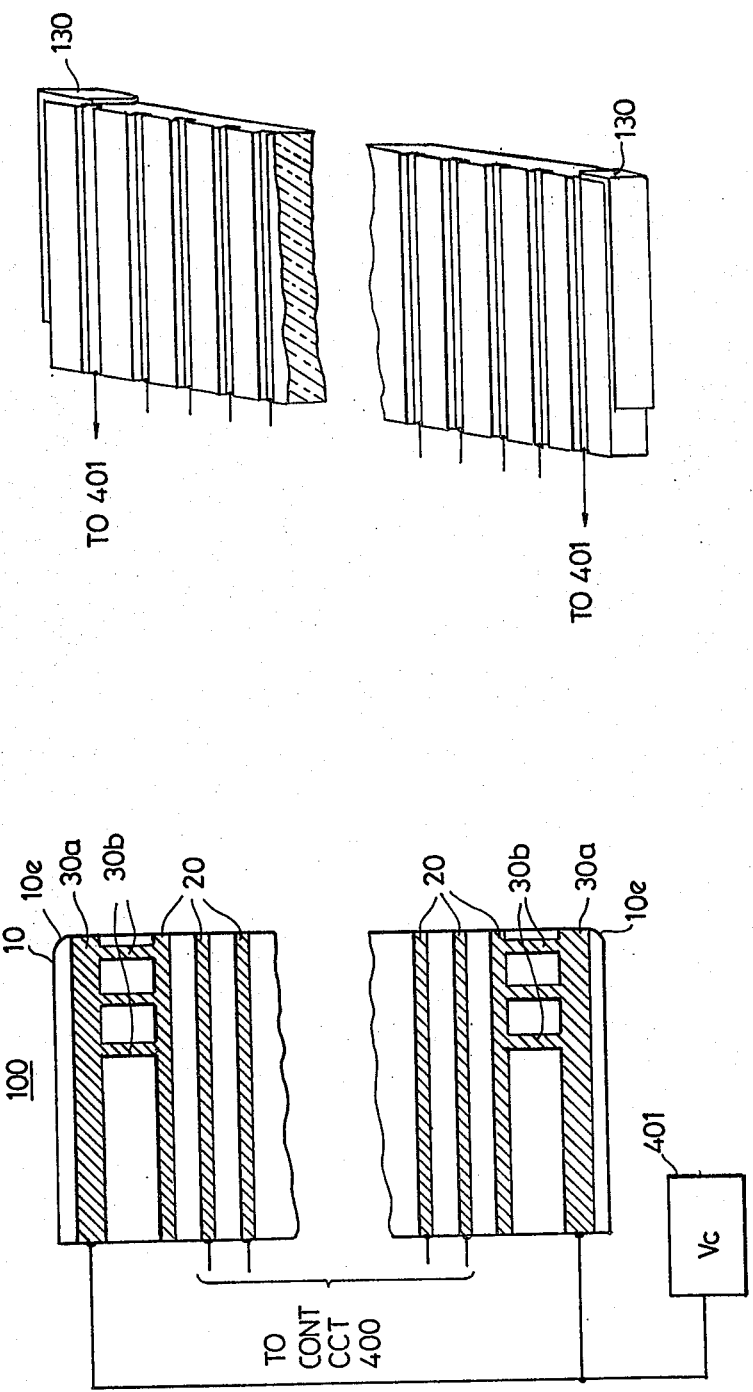

ELECTROOSMOTIC INK PRINTER HEAD

CROSS-REFERENCE TO RELATED APPLICATIONS

The present invention is related to copending U.S. patent application Ser. No. 301,449, invented by T. Kohashi, filed Sept. 11, 1981, titled "Electroosmotic Ink Printer" and to copending U.S. patent application Ser. No. 390,967, invented by T. Kohashi, filed June 22, 1982, titled "Ink Recording Apparatus", both assigned to the same assignee as the present application.

BACKGROUND OF THE INVENTION

The present invention relates to an ink printer head utilizing the electroosmotic movement of the liquid in a system comprising a porous member sandwiched between opposed electrodes.

A known electroosmotic ink printer head comprises a plurality of first electrodes successively arranged on a surface of a dielectric support, a second, liquid-permeable electrode and a porous member sandwiched between the first and second electrodes. Means are provided to cause ink to permeate through the second electrode to the porous member. Potentials of recording signals are applied to the first electrodes with respect to the second electrode to cause the ink in the porous member to electroosmotically migrate along the paths of first electrodes to the front edge of the support adjacent to which a recording medium is located.

However, the ink employed in the printer has a tendency to spontaneously leak through the porous member and wet the portions of the support's front edge where the first electrodes are not provided. This stains the edge portions of the recording medium.

SUMMARY OF THE INVENTION

Accordingly, an object of the present invention is to provide an electroosmotic ink printer head which is free from the wetting problem.

The invention contemplates the provision of an additional electrode adjacent to the otherwise wet area of a dielectric support and the application of a potential thereto with respect to the second electrode to cause the ink in the porous member to electroosmotically move in a direction from the additional electrode toward the second electrode. This causes the ink in the otherwise wet area to be pulled from the front edge of the support.

Specifically, the electroosmotic ink printer head of the invention comprises a dielectric support having a surface defined by front and rear sides and a pair of opposite ends. An array of first electrodes is provided on said surface extending rearward from the front side of the support. A porous member is provided in overlying relation with the first electrodes in contact with said surface. On the porous member is a second, liquid-permeable electrode on which is provided a means for supplying ink thereto to allow it to permeate therethrough to the porous member. A third electrode is located adjacent to each end of the array of the first electrodes and to the front side of the support.

BRIEF DESCRIPTION OF THE DRAWINGS

The present invention will be described in further detail with reference to the accompanying drawings, in which:

FIG. 6 is a plan view of a second modification of the invention;

FIG. 7 is a perspective view of a third modification of the invention;

DETAILED DESCRIPTION

Figure 1:
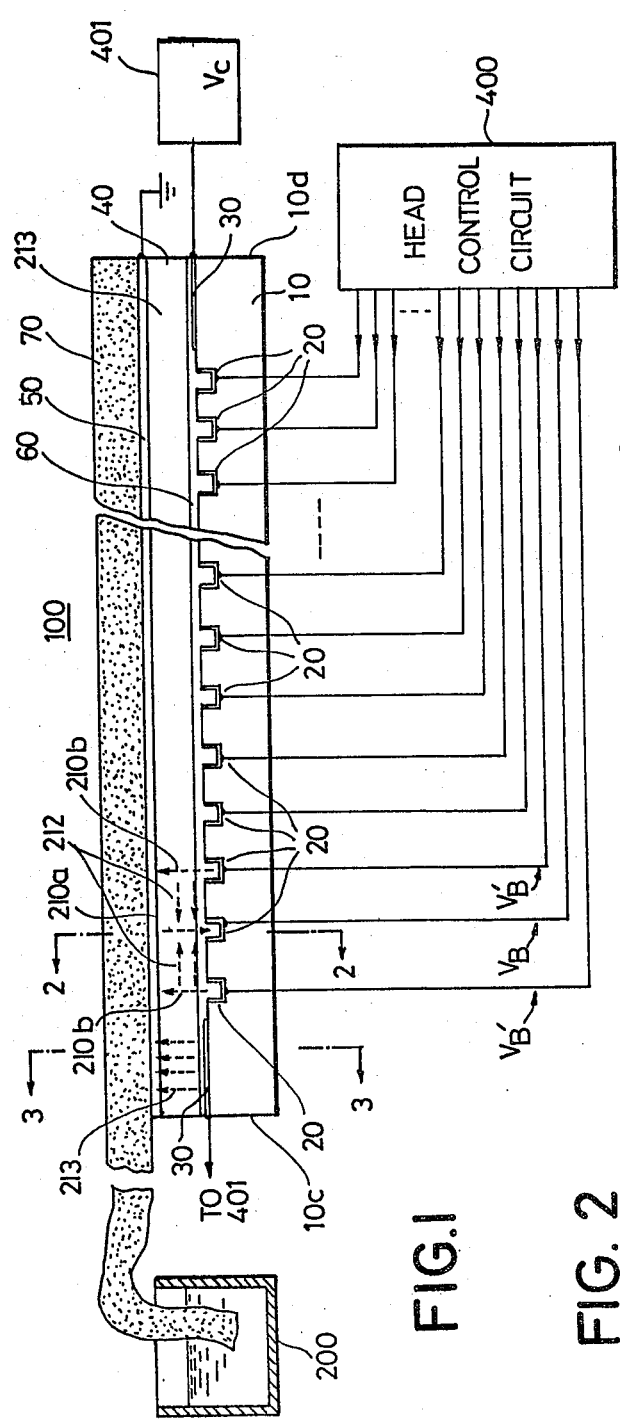
FIG. 1 is a front view of an electroosmotic ink printer head of the invention.
Figure 2:
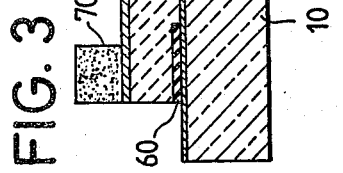
FIG. 2 is a cross-sectional view taken along the line 2—2 of FIG. 1.
Figure 3:
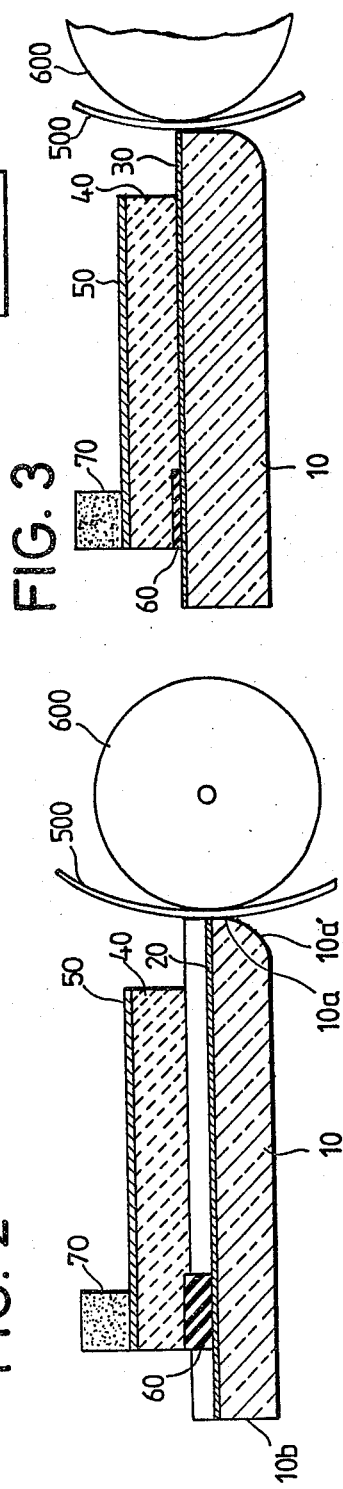
FIG. 3 is a cross-sectional view taken along the line 3—3 of FIG. 1.

With reference now to FIGS. 1 to 3 of the drawings, a preferred embodiment of the electroosmotic ink printer head of the invention is designated generally at 100. The printer head 100 comprises a dielectric support 10 of rectangular shape formed typically of sodium borosilicate glass. The dielectric support 10 has a front side wall 10a, a rear side wall 10b and a pair of opposite end walls 10c and 10d. On the upper surface of the dielectric support 10 is formed an array of successively arranged parallel strip electrodes 20 which extend rearward from the front side wall 10a of the dielectric support. The electrodes 20 are coupled individually to a known head control circuit 400 which drives them in a manner as disclosed in the aforesaid copending applications. More specifically, the electrodes 20 are impressed with modulated voltages to form a print line on a recording sheet 500 engaging a platen 600, the sheet being successively advanced by the width of a line by a paper feeder, not shown. Each of the electrodes 20 preferably has a U-shaped cross-section. This is achieved by depositing metal on the inner walls and bottom of a groove formed on the upper surface of the dielectric support 10 to a depth of 20 to 70 micrometers. Three to eight such grooves are formed per millimeter within an intermediate area between the opposite end walls 10c and 10d as by etching or machining to leave space in each end portion of the support 10 for reasons of manufacture. On the upper surface of the support are subsidiary electrodes 30 which extend parallel with the electrodes 20 from the front side 10a to the rear side 10b and are spaced from outermost electrodes 20. Each of the subsidiary electrodes 30 is coupled to a common voltage source 401 having a positive voltage $V_C$. In a practical embodiment, the electrodes 20 and 30 are made of a nonporous metal which may be formed by vacuum depositing chrome or the like to a thickness of 0.1 to 0.3 micrometers as a precoat and subsequently by vacuum depositing gold to a thickness of 1 micrometer or by electroplating.

A block of porous material 40 is secured to the upper surface of the dielectric support 10 to define electroosmotic liquid passages with the grooved electrodes 20. The porous member 40 has an average pore size such that it permits the ink employed in the invention to permeate therethrough in the direction of thickness. Preferably, the porous member 40 is a microporous membrane filter comprising cellulose acetate having a porosity of 60% to 80% with an average pore size of 0.1 to 8 micrometers and has a thickness of 20 to 200 micrometers. Depending on applications the material of the porous member 40 may be selected from plastic materials, glass and porcelain.

Figure 4:
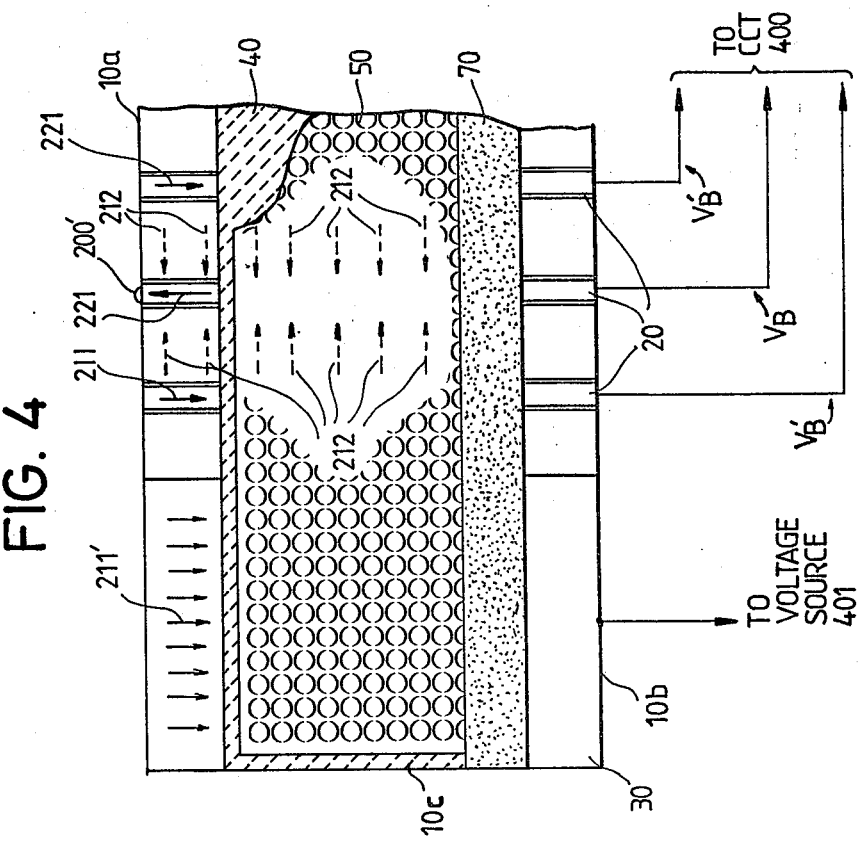
FIG. 4 is a partial plan view of the printer head of FIG. 1.

The porous member 40 is preferably spaced inwardly at the front edge thereof from the front side wall 10a of the support 10 by a distance of typically 50 to 300 micrometers as shown in FIG. 4 to leave the portion of the support's upper surface exposed which is adjacent to the front side 10a. The manner of this exposure is to utilize to the fullest extent the liquid's electroosmotic movement and the edge converging effect of the dielectric support 10 that affects the behavior of ink adjacent to the front side 10a of the support. The front-to-rear dimension of the porous member 40 determines the amount of ink to be supplied to the front side 10a of the support. In most applications an appropriate value of this dimension is 20 millimeters or greater.

On the porous member 40 is a liquid-pervious mesh electrode 50 having a mesh of 100 to 300 and a thickness of 50 to 300 micrometers to permit the ink to permeate therethrough to the underlying porous member 40. This electrode is coupled to ground to serve as a common electrode and may be formed by depositing a conductive paint such as graphite on the surface of the porous member 40. Illustrated at 60 is a sealing member such as adhesive which serves to bond the rear edge portion of the porous member 40 to the dielectric support 10 as shown in FIGS. 2 and 3 to prevent ink from flowing rearward.

Ink is supplied to the mesh electrode 40 from an ink container 200 by means of a capillary conduit 70 formed preferably of sponge. The ink supply means 70 extends over the electrode array 20 to spread ink and permeates uniformly in the porous member 40. Suitable material for the ink is a liquid containing gamma-methacryloxy-propyltrimethoxysilane with the necessary binding and charge controlling agents and surfactant mixed at a weight ratio of 2 to 5% with oil-soluble dyestuffs such as azo or anthraquinone dyes to serve as a colorant. The ink preferably has a specific resistivity of $10^6$ ohm-cm or greater and a viscosity of 10 centimeter-stokes or less.

The ink of the type referred to above exhibits an electroosmotic movement within the porous member from a given point toward a negatively charged area of the head. The speed of this movement increases as a function of the applied voltage whose maximum value is determined so that the field intensity generated never exceeds 2 volts/micrometer to avoid insulation breakdown.

Assuming for the purpose of discussion that electrodes 20 are applied with negative turn-on voltages ($V_B$) and positive turn-off ($V_B'$) voltages alternately across the electrode array. The negative turn-on voltages are modulated in amplitude or in pulse duration or both with a video signal to be recorded. Electroosmotic movements of ink occur in various parts of the porous member 40 including those moving upward from the $V_B$-applied electrodes to the upper electrode 50 as indicated by broken-line arrows 210a in FIG. 1 and those moving downward from the latter to the $V_B'$-applied electrodes as indicated by broken-line arrows 210b. Sideways movements also occur in the porous member 40 and on the interface between it and the support 10 as indicated by broken-line arrows 212 in opposite directions from the $V_B'$-applied electrodes to the $V_B$-applied electrodes in FIGS. 1 and 4. Ink is thus collected in the grooves of the $V_B$-applied electrodes by amounts respectively proportional to the amplitudes of the applied voltages. The ink collected in such electrodes is now pulled forward by electroosmosis action and emerges from the front edge 10a as shown at 200' (FIG. 4) to produce an ink spot on the recording sheet 500. On the other hand, the ink which exists in the $V_B'$-applied electrodes is pulled rearward by the electroosmotic action. A liquid converging effect occurs at the front upper edge of the support 10. As a result, the dot produced on the recording sheet 500 is rendered considerably small and high density recording is made possible.

For utilization of the above-mentioned electroosmotic and edge converging effects to the fullest extent, it is desirable that the front edge of porous member 40 be spaced uniformly from the front side of support 10 to leave a portion of the surface of the support 10 exposed which is adjacent to its front edge. If this spacing is too small the edge converging effect is reduced, causing a reduction in the power of resolution and if the spacing is too large the electroosmotic effect on the liquid at the front edge is reduced, causing a failure to pull back all the unnessary ink producing a smeared image.

By reason of the provision of the subsidiary electrodes 30, a layer of ink present between each electrode 30 and the overlying porous member 40 electroosmotically moves upward as indicated by broken-line arrows 213 in FIG. 1. This electroosmotic movement produces a rearward pull on the ink on the subsidiary electrodes 30 as indicated by arrows 211' in FIG. 4 which has spontaneously leaked out to the peripheral edges of the support 10.

In a practical embodiment the front side wall 10a of the support is rounded along its lower edge as at 10a' to provide smooth contact with the recording sheet 500. Furthermore, the support 10 has its front corners rounded as at 10e as seen in FIG. 6. This ensures against the contacting of the ink in the corner areas with the recording sheet. It is preferable in that instance that the overlying porous member 40 and electrode 50 have rounded corners.

It is necessary that the subsidiary electrodes 30 be spaced a predetermined distance from the outermost ones of the electrodes 20. If this spacing is not observed ink would emerge from the porous member 40 toward the front edge of the support. The embodiment of FIG. 1 thus needs a close manufacturing tolerance which would increase cost.

Figure 5:
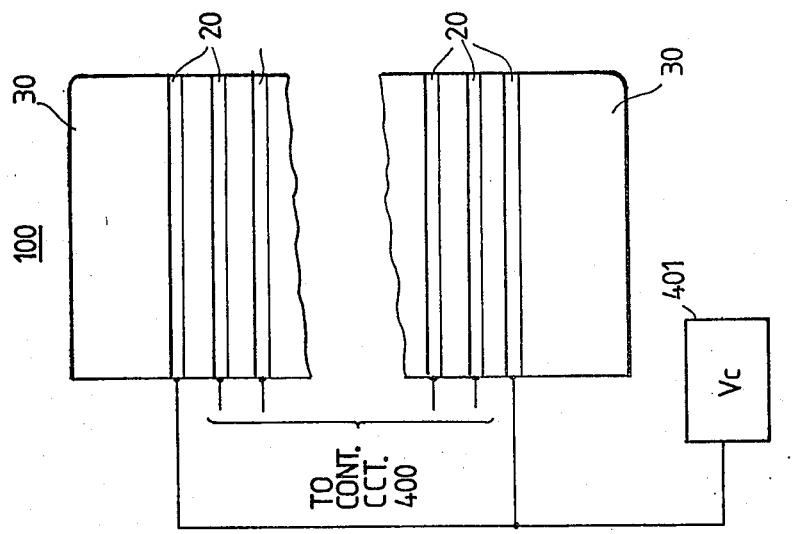
FIG. 5 is a plan view of a modified embodiment of the invention.

FIG. 5 is an illustration of a modified embodiment of the invention in which the subsidiary electrodes 30 are coupled edgewise with the outermost electrodes 20 and connected to the same biasing potential Vc. In this embodiment the outermost electrodes 20 serve as a part of the subsidiary electrodes 30. This arrangement eliminates the need to observe the close tolerance mentioned above. The sacrificing of two recording electrodes is not substantial for practical purposes.

In the previous embodiments the electrodes 20 are formed by initially creating parallel grooves, then follows the vacuum deposition of metal over the entire surface of the support 10. The portions of the metal which lie over raised areas are then removed to produce the grooved electrodes 20. Therefore, the provision of the subsidiary electrodes 30 involves an additional vacuum-deposition step after the metal on the raised areas has been removed.

To reduce the number of manufacturing steps, the outer end portions of the support 10 are initially machined or etched to create patterns for the subsidiary electrodes 30 together with the grooves for the electrodes 20 and the entire surface is coated by vacuum-deposition of metal and then the raised areas are removed.

FIG. 6 is an illustration of an example of etching patterns of the recording electrodes 20 and subsidiary electrodes 30. Each of the subsidiary electrode patterns comprises an area 30a extending parallel to the end walls of the support 10 and a plurality of intermediate areas 30b connected from the area 30a to the groove of adjacent outermost electrode. The intermediate areas 30b are located adjacent to the front edge of the support 10. A layer of metal is deposited on the support 10 and then the portions of the deposited layer on the raised areas are removed, leaving the metal indicated by hatching in the etched areas. The metal strip in the area 30a is connected to the voltage source 401 to serve as a current feeder. The outermost electrodes are biased to the same potential as in FIG. 5.

The subsidiary electrode 30 is further modified as shown in FIG. 7. In this modification subsidiary electrodes are formed on the front side wall 10a and the end walls 10c, 10d of the support 10. Each subsidiary electrode 130 is in contact with the adjacent outermost electrode and extends to the corner of the support and turns to extend along the end wall. The outermost electrodes are connected to the voltage source 401 to bias the subsidiary electrodes 130. The porous member 40 is located so that its outer periphery near the front side and end walls is spaced inwardly therefrom. Application of the biasing voltage to the subsidiary electrodes 130 pulls in the otherwise leaking ink via the peripheral areas of the porous member 40 to the upper electrode 50. This embodiment minimizes the areas otherwise occupied by the subsidiary electrodes 30 on the upper surface of the support 10.

In the previous embodiments description is based on electroosmotic movement of ink toward negatively biased electrodes, the invention could equally as well be applied to embodiments in which the liquid is moved toward positively biased electrodes. In that instance the polarities of the voltage sources are reversed to those described above.

Figure 8:
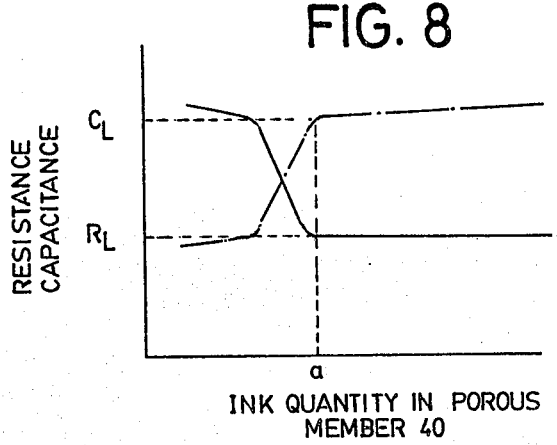
FIG. 8 is a graphic illustration of the resistance curve of the ink permeating the porous member.

It is found that the ink employed in the present invention exhibits a varying electrical resistance and capacitance depending on the amount of its dyestuff in proportion to its solvent. If the amount of ink supply is reduced, the solvent tends to evaporate through the porous member 40 and the dyestuff will increase in proportion to the solvent. As a result, the resistance increases sharply from a certain value as indicated by $R_L$ in FIG. 8 and the capacitance decreases sharply from a certain value indicated by $C_L$ if the amount of ink contained in the porous member 40 decreases below a limit value a. As a result, the interstices of the porous member 40 are clogged by the excessive dyestuff. On the other hand, if the ink is excessively supplied to the head 100, the excessive amount of ink will leak through the porous member 40 to the periphery of the support 10. For these reasons it is preferable to include a means for controlling the amount of ink supplied to the head 100 at a constant value.

Figure 9:
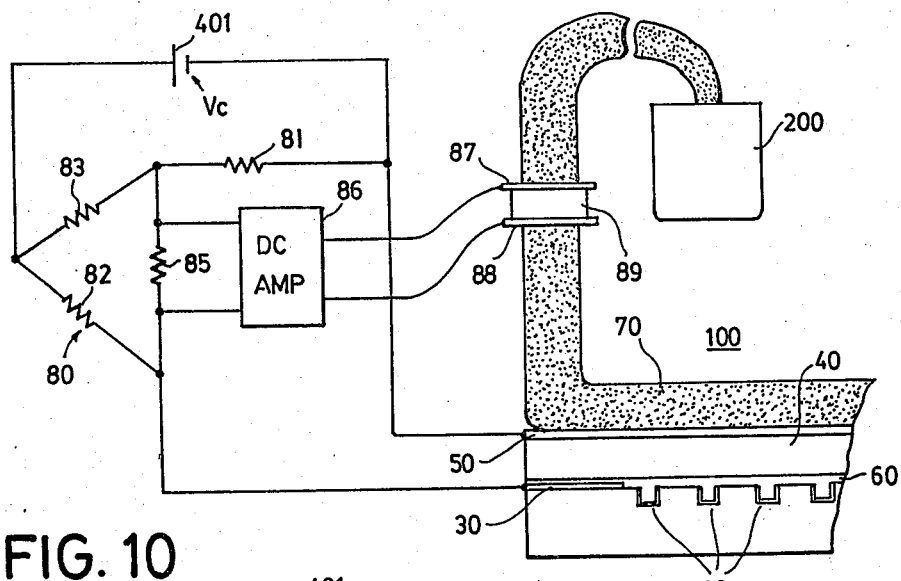
FIGS. 9 and 10 are illustrations of ink supply control circuits of the invention.

To this end an embodiment shown in FIG. 9 includes a DC bridge circuit 80 having resistors 81 and 82 connected in the first opposite arms of the bridge and a resistor 83 connected in one of the second opposite arms. The other of the second arms is provided by the electrical resistance between the subsidiary electrode 30 and the upper electrode 50. The resistors 81 and 83 are connected across the voltage source 401 at Vc. The values of resistors 81 to 83 are determined so that there is no current in a resistor 85 when the liquid's resistance corresponds to the reference value $R_L$. The resistor 85 is coupled to a DC amplifier 86 to supply it with a voltage indicative of the amount of deviation of resistance from $R_L$ and the direction of that deviation. A flow-rate regulating means 90 is provided in the sponge 70 to respond to the voltage developed in the amplifier 86 by regulating the flow rate of ink supplied to the head 100. The regulating means 90 comprises a pair of mesh electrodes 87 and 88 and a porous member 89 between them. When the resistance deviates from $R_L$, the DC amplifier 86 supplies the electrodes 87 and 88 with a voltage proportional to that deviation to electroosmotically control the movement of the liquid passing through the porous member 89 until the deviation reduces to zero.

Figure 10:
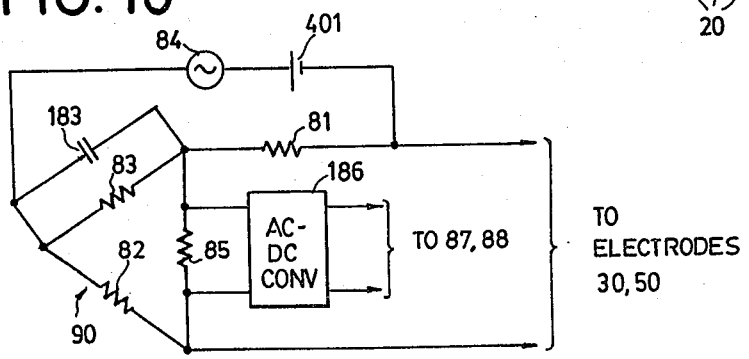

FIG. 10 is an illustration of a circuit 90 for detecting the capacitance value of the ink that permeates the porous member 40. The circuit is generally similar to that shown in FIG. 9 with the exception that an AC voltage source 84 is connected in series with the DC voltage source 401 and a capacitor 183 is coupled in parallel with the resistor 83. An AD-DC converter 186 is used instead of the DC amplifier 86.

Preferably, the porous member 89 has an average pore size smaller than the average pore size of the porous member 40. This excludes unsoluble dyestuff and foreign particles from the ink and prevents the intrusion of such matters to the porous member 40 to avoid the clogging of the latter.

What is claimed is:

1. An electroosmotic ink printer head comprising:
   a dielectric support having a surface defined by front and rear sides and a pair of opposite ends;
   an array of first electrodes successively arranged on said surface and extending rearwardly from said front side;
   a porous member overlying said first electrodes in contact with said surface and having a front edge spaced from said front side of the support;
   a second, liquid-permeable electrode on said porous member;
   means for supplying ink to said porous member through said second electrode; and
   a third electrode located adjacent to each end of said array of first electrodes and to said front side of the support.

2. An electroosmotic ink printer head as claimed in claim 1, wherein said third electrode is provided on said surface.

3. An electroosmotic ink printer head as claimed in claim 1, wherein said third electrode is provided on a corner of said support including a portion of the front side of the support and a portion of a said end of the support.

4. An electroosmotic ink printer head as claimed in claim 1, wherein said third electrode is connected to each outermost one of said first electrodes.

5. An electroosmotic ink printer head as claimed in claim 1, wherein each of said first electrodes is formed in a groove.

6. An electroosmotic ink printer heas as claimed in claim 5, wherein said third electrode is formed in a reduced portion from said surface.

7. An electroosmotic ink printer head as claimed in claim 1, wherein said porous member overlies said third electrode.

8. An electroosmotic ink printer head as claimed in claim 1, further comprising means for controlling the amount of said supplied ink at a constant value.

9. An electroosmotic ink printer head as claimed in claim 8, wherein said controlling means comprises:
   means for generating a signal representative of the amount of and the direction of deviation of said supplied ink from a reference corresponding to said constant value; and
   means responsive to said signal for regulating the amount of ink supplied to said second electrode.

10. An electroosmotic ink printer head as claimed in claim 9, wherein said signal generating means comprises means for detecting the electrical resistance value of the ink permeating said porous member.

11. An electroosmotic ink printer head as claimed in claim 10, wherein said resistance detecting means comprises a DC bridge circuit connected across said second and third electrodes and means for applying an output signal of the DC bridge circuit to said regulating means.

12. An electroosmotic ink printer head as claimed in claim 9, wherein said signal generating means comprises means of detecting the capacitance value of the ink permeating said porous member.

13. An electroosmoctic ink printer head as claimed in claim 12, wherein said capacitance detecting means comprises an AC bridge circuit coupled to said second and third electrodes and an AC-to-DC converter coupled to the output of said bridge circuit.

14. An electroosmotic ink printer head as claimed in claim 9, wherein said regulating means comprises a pair of liquid-permeable electrodes and a second porous member sandwiched therebetween, said liquid-permeable electrodes being interposed in an ink flow passage of said ink supplying means and coupled to said signal generating means to electroosmotically regulate the flow rate of ink.

15. An electroosmotic ink printer head as claimed in claim 14, wherein said second porous member has an average pore size smaller than the average pore size of the first-mentioned porous member.

16. An electroosmotic ink printer comprising:
    a printer head including a dielectric support having a surface defined by front and rear sides and a pair of opposite ends; an array of first electrodes successively arranged on said surface and extending rearwardly from said front side; a porous member overlying said first electrodes in contact with said surface and having a front edge spaced from said front side; a second, liquid-permeable electrode on said porous member; means for supplying ink to said porous member through said second electrode; and a third electrode located adjacent to each end of the array of said first electrodes and to said front side,
    first means for supplying recording signals to said first electrodes, and
    second means for supplying a potential across said second and third electrodes to cause the ink in said porous member to electroosmotically move in a direction from the third electrode to said second electrode.

* * * * *